(12) United States Patent
Kuroki et al.

(10) Patent No.: US 11,173,978 B2
(45) Date of Patent: Nov. 16, 2021

(54) AIRBAG DEVICE FOR SADDLE-TYPE VEHICLE

(71) Applicant: HONDA MOTOR CO., LTD., Tokyo (JP)

(72) Inventors: Kazuyoshi Kuroki, Wako (JP); Futoshi Miyakawa, Wako (JP); Yuki Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/048,932

(22) PCT Filed: Apr. 27, 2018

(86) PCT No.: PCT/JP2018/017240
§ 371 (c)(1),
(2) Date: Oct. 19, 2020

(87) PCT Pub. No.: WO2019/207777
PCT Pub. Date: Oct. 31, 2019

(65) Prior Publication Data
US 2021/0171145 A1 Jun. 10, 2021

(51) Int. Cl.
*B62J 27/20* (2020.01)
*B62J 17/04* (2006.01)
*B60R 21/20* (2011.01)

(52) U.S. Cl.
CPC .............. *B62J 27/20* (2020.02); *B60R 21/20* (2013.01); *B62J 17/04* (2013.01)

(58) Field of Classification Search
CPC .... B62J 27/20; B62J 50/21; B62J 7/04; B60R 21/16; B60R 21/20; B60R 2021/0088; B60R 21/215
See application file for complete search history.

(56) References Cited

U.S. PATENT DOCUMENTS

2003/0189323 A1* 10/2003 Akiyama ................ B62J 27/00
280/729
2009/0194980 A1* 8/2009 Kobayashi ............. B62J 27/20
280/728.3
(Continued)

FOREIGN PATENT DOCUMENTS

DE         10308601 A1 *  9/2003  ............. B60R 21/16
DE     102004009248 A1 *  9/2005  ............. B62J 17/04
(Continued)

OTHER PUBLICATIONS

International Search Report, dated Jul. 7, 2018, 1 page.
(Continued)

*Primary Examiner* — Paul N Dickson
*Assistant Examiner* — Matthew D Lee
(74) *Attorney, Agent, or Firm* — Rankin, Hill & Clark LLP

(57) ABSTRACT

To be able to compactly dispose an airbag device for a saddle-type vehicle provided with an airbag deployable upward. An airbag device for a saddle-type vehicle includes: an inflator; an airbag adapted to be expanded by gas discharged from the inflator; and a retainer accommodating the airbag. The airbag is deployed upward from an opening of the retainer. The retainer is disposed in front of a head pipe adapted to support a handle for steering. A wind screen is disposed above the retainer. The wind screen openably and closably covers the opening of the retainer.

16 Claims, 4 Drawing Sheets

(56) References Cited

U.S. PATENT DOCUMENTS

| | | | | |
|---|---|---|---|---|
| 2011/0074138 A1* | 3/2011 | Kuroki | ............... | B62J 27/20 |
| | | | | 280/730.1 |
| 2016/0288854 A1* | 10/2016 | Hagimoto | ............ | B62J 17/04 |
| 2017/0232921 A1* | 8/2017 | Richard | ............ | B60R 21/231 |
| | | | | 280/730.1 |
| 2018/0208145 A1* | 7/2018 | Sato | ............ | B60R 21/26 |
| 2018/0208148 A1* | 7/2018 | Sato | ............ | B62J 27/00 |
| 2021/0170976 A1* | 6/2021 | Miyakawa | ............ | B60R 21/16 |

FOREIGN PATENT DOCUMENTS

| | | | | | |
|---|---|---|---|---|---|
| DE | 102013217851 | A1 | | 3/2015 | |
| EP | 3160801 | B1 | | 3/2018 | |
| JP | 2007269289 | A | * | 10/2007 | |
| JP | 2008-183913 | | | 8/2008 | |
| JP | 2008183913 | A | * | 8/2008 | ............ B62J 27/20 |
| JP | 2014184787 | A | * | 10/2014 | |
| WO | WO-2019207775 | A1 | * | 10/2019 | ............ B62J 17/04 |

OTHER PUBLICATIONS

Written Opinion of the International Searching Authority dated Jul. 17, 2018 filed in PCT/JP2018/017240, 3 pages.
Taiwanese Office Action dated Nov. 11, 2019, 3 pages.
European Search Report dated Mar. 3, 2021, 7 pages.
International Preliminary Report on Patentability, 5 pages.
Indian Office Action dated Apr. 3, 2021, 6 pages.

* cited by examiner

AIRBAG DEVICE FOR SADDLE-TYPE VEHICLE

TECHNICAL FIELD

The present invention relates to an airbag device for a saddle-type vehicle.

BACKGROUND ART

In the related art, an airbag device for a saddle-type vehicle has been known in which an airbag, which is deployable outside the saddle-type vehicle, is deployed between an object of collision and the saddle-type vehicle (see Patent Literature 1, for example). According to the airbag device of Patent Literature 1, the airbag is deployed between the object of collision and the saddle-type vehicle, and the airbag is thus likely to increase in size.

CITATION LIST

Patent Literature

[Patent Literature 1]
Japanese Patent Laid-Open No. 2008-183913

SUMMARY OF INVENTION

Technical Problem

Incidentally, in regard to an airbag device for a saddle-type vehicle, it is conceivable to protect a passenger with an airbag deployable upward in front of the passenger. It is desirable that such an airbag device be compactly disposed in the saddle-type vehicle.

An object of the present invention, which has been made in view of the aforementioned circumstances, is to be able to compactly dispose an airbag device for a saddle-type vehicle provided with an airbag deployable upward.

Solution to Problem

According to an aspect of the present invention, there is provided an airbag device for a saddle-type vehicle including: an inflator (53); an airbag (52) adapted to be expanded by gas discharged from the inflator (53); and a retainer (51) accommodating the airbag (52), the airbag (52) being deployed upward from an opening (51e) of the retainer (51), in which the retainer (51) is disposed in front of a head pipe (14) adapted to support a handle (23) for steering, a wind screen (32) is disposed above the retainer (51), and the wind screen (32) openably and closably covers the opening (51e) of the retainer (51).

Also, in the aspect of the present invention, a headlight (33) disposed in front of the head pipe (14) and a meter (36) disposed in front of the handle (23) may be provided, and the retainer (51) may be disposed between the headlight (33) and the meter (36) in a side view of the vehicle.

Also, in the aspect of the present invention, the retainer (51) may overlap the head pipe (14) in a front view of the vehicle.

Further, in the aspect of the present invention, the opening (51e) may be opened toward a front upper side and may be disposed to be inclined rear-upward in a side view of the vehicle, and the wind screen (32) may be disposed to be inclined rear-upward in a side view of the vehicle.

Also, in the aspect of the present invention, the wind screen (32) may be able to swing in a front-back direction via a hinge (41c) provided at a lower portion of the wind screen (32).

Also, in the aspect of the present invention, a cap member (54) adapted to cover the opening (51e) of the retainer (51) may be provided, and the cap member (54) may include an extending portion (54c) extending toward the wind screen (32).

Advantageous Effects of Invention

The airbag device for a saddle-type vehicle according to the aspect of the present invention includes: the inflator; the airbag adapted to be expanded by gas discharged from the inflator; and the retainer accommodating the airbag, the airbag is deployed upward from the opening of the retainer, the retainer is disposed in front of the head pipe adapted to support the handle for steering, the wind screen is disposed above the retainer, and the wind screen openably and closably covers the opening of the retainer.

With this configuration, the wind screen openably and closably covers the opening of the retainer, and the airbag can be deployed upward from the opening in a state in which the opening is opened. It is thus possible to compactly dispose the airbag device at a front portion of the motorcycle using a space covered with the wind screen.

Also, according to the aspect of the present invention, the headlight disposed in front of the head pipe and the meter disposed in front of the handle may be provided, and the retainer may be disposed between the headlight and the meter in a side view of the vehicle. With this configuration, it is possible to compactly dispose the airbag device using a portion between the headlight and the meter.

Also, according to the aspect of the present invention, the retainer may overlap the head pipe in a front view of the vehicle. With this configuration, it is possible to compactly dispose the retainer in front of the head pipe and at a position at which the retainer overlaps the head pipe in a front view of the vehicle.

Further, according to the aspect of the present invention, the opening may be opened toward the front upper side and is disposed to be inclined rear-upward in a side view of the vehicle, and the wind screen may be disposed to be inclined rear-upward in a side view of the vehicle. With this configuration, it is possible to deploy the airbag upward from the opening and to satisfactorily block the opening disposed rear-upward in a side view of the vehicle with the wind screen disposed to be inclined rear-upward in a side view of the vehicle.

Also, according to the aspect of the present invention, the wind screen may be able to swing in the front-back direction via the hinge portion provided at a lower portion of the wind screen. With this configuration, it is possible to efficiently open the opening of the retainer upward by the wind screen swinging via the hinge portion at the lower portion of the wind screen and to satisfactorily deploy the airbag upward.

Also, according to the aspect of the present invention, the cap member adapted to cover the opening of the retainer may be provided, and the cap member may include the extending portion extending toward the wind screen. With this configuration, it is possible to cause the wind screen to quickly swing by pressing the wind screen with the extending portion of the cap member and to quickly deploy the airbag.

DESCRIPTION OF EMBODIMENT

Hereinafter, an embodiment of the present invention will be described with reference to drawings. Note that indications of directions such as front, rear, left, right, up, and down in the description will be defined to be the same as directions relative to a vehicle body unless particularly indicated otherwise. Also, the reference sign FR represented in each diagram represents the front side of the vehicle body, the reference sign UP represents the upper side of the vehicle body, and the reference sign LH represents the left side of the vehicle body.

Figure 1:
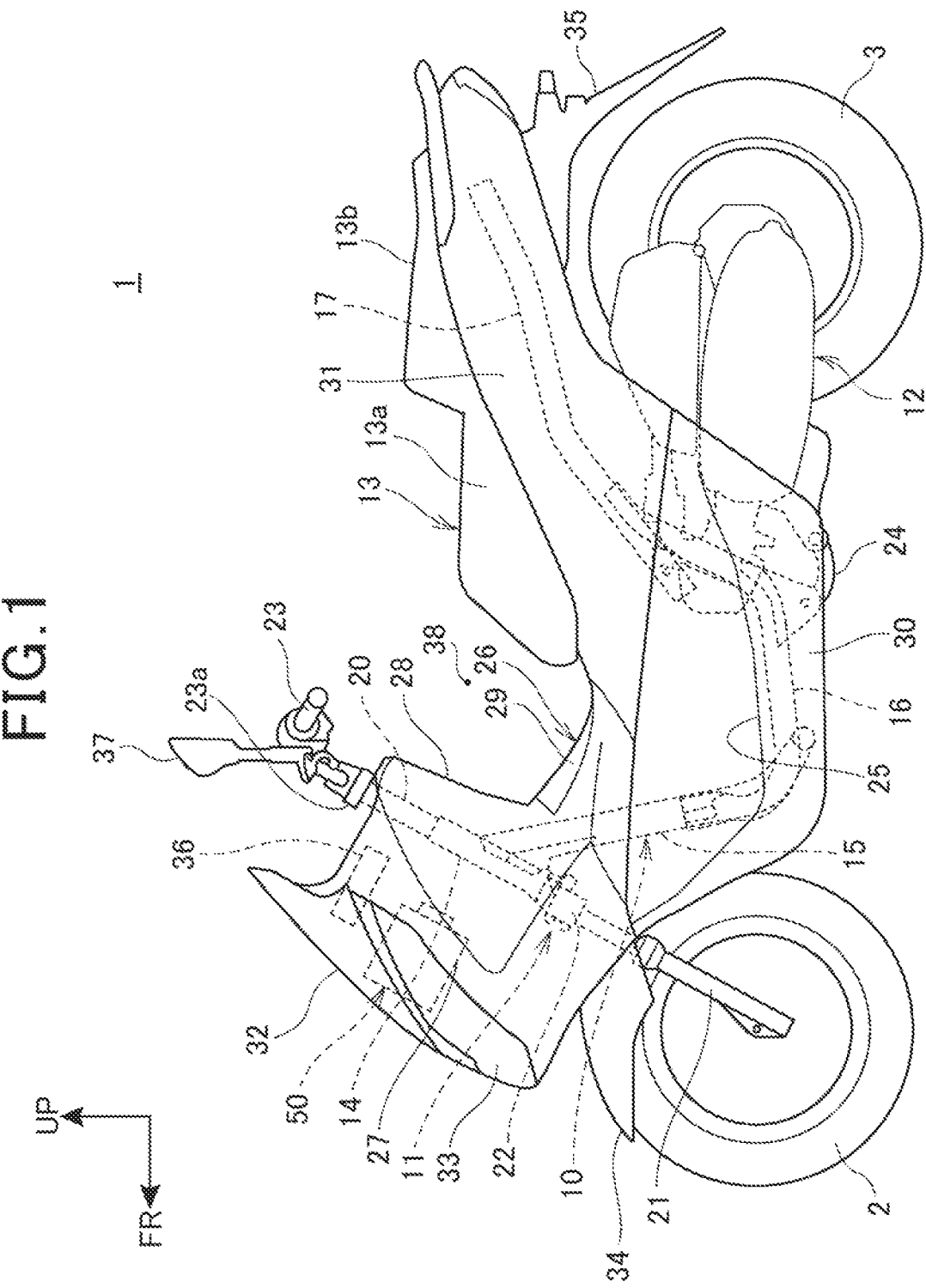
FIG. 1 is a left side view of a motorcycle 1 according to an embodiment of the present invention.

FIG. 1 is a left side view of a motorcycle 1 according to an embodiment of the present invention. Note that FIG. 1 illustrates only components on the left side including reference signs for components that are provided as pairs on the left and right sides.

The motorcycle 1 is a saddle-type vehicle of a scooter type including a vehicle body frame 10, a steering system 11 adapted to support a front wheel 2 in a steerable manner, a power unit 12 supported at a rear portion of the vehicle body frame 10, a rear wheel 3, and a seat 13 in which a passenger is seated in a straddling manner.

The vehicle body frame 10 includes a head pipe 14 provided at a front end of the vehicle body frame 10, a main frame 15 extending toward a rear lower side from the head pipe 14, a pair of left and right lower frames 16, 16 extending backward from a lower end portion of the main frame 15, and a pair of left and right rear frames 17, 17 extending backward toward a rear upper side from the lower frames 16, 16. The head pipe 14 is disposed at the center of a vehicle width similarly to the front wheel 2.

The steering system 11 includes a steering shaft 20 pivotally supported by the head pipe 14, a pair of left and right front forks 21, 21 disposed on both left and right sides of the front wheel 2 and supporting the front wheel 2, a bridge member 22 secured to a lower end of the steering shaft 20 and coupling upper portions of the left and right front forks 21, 21, and a handle 23 secured to an upper end of the steering shaft 20. The handle 23 for steering is connected to the steering shaft 20 via a handle post 23a secured to the upper end of the steering shaft 20.

In a side view of the vehicle, the head pipe 14 is inclined backward with respect to the vertical direction by the amount of a predetermined caster angle set in the motorcycle 1. The steering shaft 20 is inserted into and pivotally supported by the head pipe 14 and is disposed so as to be inclined backward in a side view of the vehicle.

The power unit 12 is a unit swing engine that has functions of an engine as a drive source for the rear wheel 3 and of a swing arm that supports the rear wheel 3. The power unit 12 is pivotally supported by the vehicle body frame 10 so as to be able to swing via a link member 24 provided at a front end portion of the power unit 12.

The seat 13 is provided above the rear frame 17. The seat 13 includes a front-side seat 13a in which a driver is seated and rear-side seat 13b in which a fellow passenger is seated in an integrated manner.

A pair of left and right step floors 25, 25 on which the driver places his/her left and right feet are provided on a front lower side of the front-side seat 13a.

The motorcycle 1 includes a vehicle body cover 26 adapted to cover a vehicle body such as the vehicle body frame 10.

The vehicle body cover 26 includes a front cover 27 that covers upper portions of the head pipe 14 and the steering system 11 from the front side and from the left and right sides and an inner cover 28 that is continued to a rear edge of the front cover 27 and covers the upper portions of the head pipe 14 and the steering system 11 from the rear side.

Also, the vehicle body cover 26 includes a center cover 29 located on a front lower side of the front-side seat 13a, an undercover 30 that covers the vehicle body from the lower side below the step floors 25, 25, and a rear-side cover 31 that covers the rear frames 17, 17 from the sides below the seat 13.

A wind screen 32 that is inclined toward the rear upper side in a side view of the vehicle is attached to an upper portion of the front cover 27. A headlight 33 is provided on a front surface of the front cover 27.

The motorcycle 1 includes a front fender 34 and a rear fender 35.

The meter 36 adapted to display information regarding the motorcycle 1 such as a vehicle speed is disposed in front of the handle 23. Rear-view mirrors 37, 37 are attached to the handle 23.

A front portion of the center cover 29 is continued to a lower portion of the inner cover 28. The center cover 29 is located inside left and right legs of the driver stretched from the front-side seat 13a to the step floors 25, 25.

A straddled space 38 recessed downward is sectioned by the inner cover 28, the center cover 29, and a front surface of the front-side seat 13a in a side view of the vehicle. The passenger can straddle the motorcycle 1 via the straddled space 38 when the passenger rides on and gets off the motorcycle 1.

The motorcycle 1 includes an airbag device 50 adapted to protect the passenger from impact at a front portion. The airbag device 50 is disposed between the steering system 11 and the wind screen 32 and is located in front of the handle 23 and the head pipe 14 in a side view of the vehicle.

Figure 2:
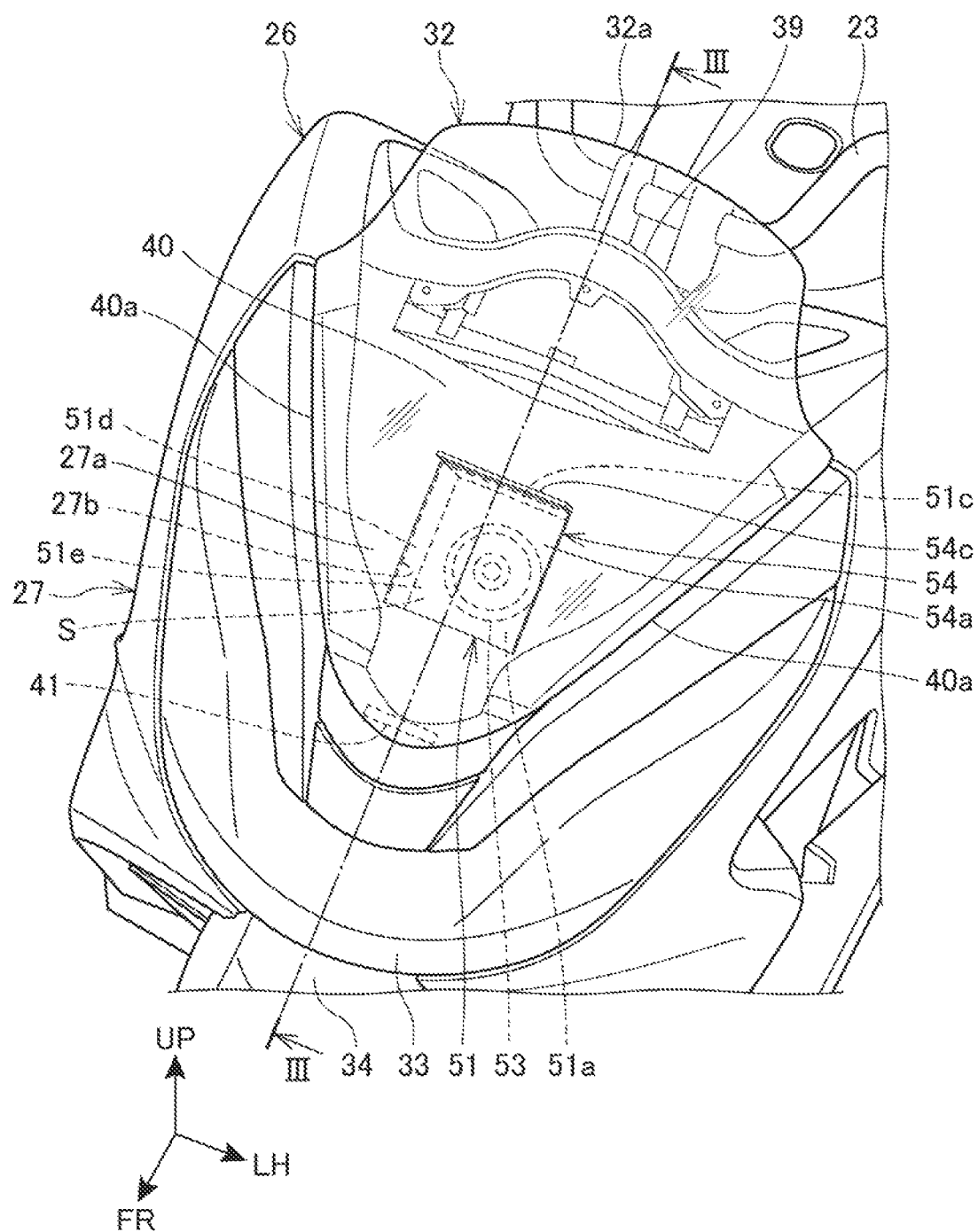
FIG. 2 is a perspective view of a front portion of the motorcycle when seen from the front side.
Figure 3:
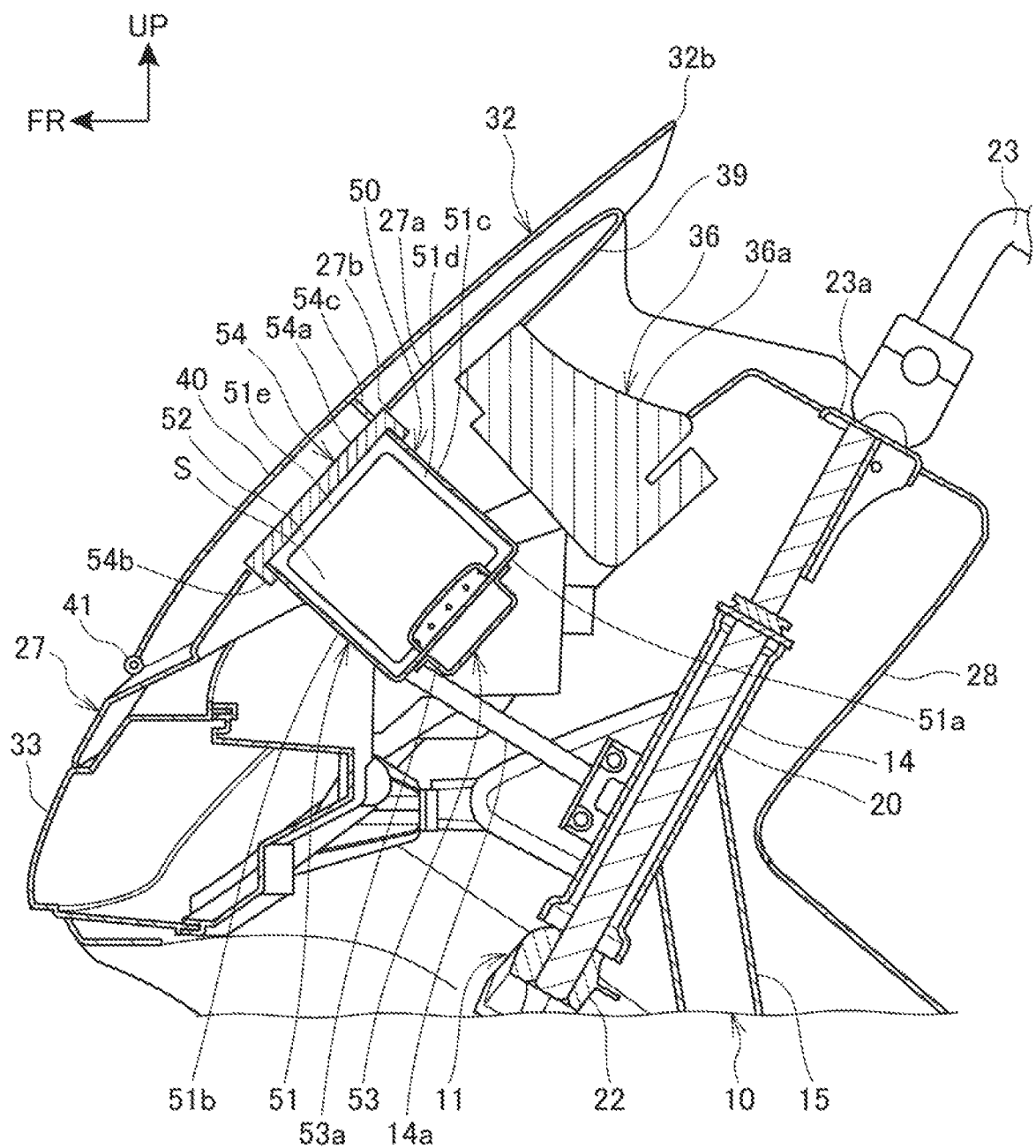
FIG. 3 is a sectional view along III-III in FIG. 2.

FIG. 2 is a perspective view of a front portion of the motorcycle 1 when seen from the front side. FIG. 3 is a sectional view along III-III in FIG. 2. In FIG. 2, an airbag 52, which will be described later, is not illustrated.

Referring to FIGS. 2 and 3, a meter 36 includes, on an upper surface, a display surface 36a adapted to display a vehicle speed and the like. The meter 36 is formed into a flat box shape and is disposed such that a plate thickness direction is oriented in the up-down direction.

The meter 36 is disposed at the center of the vehicle width above the head pipe 14 and in front of the handle post 23a. The meter 36 is disposed such that a display surface 36a on the upper surface thereof is inclined toward a rear lower side in order for the driver on the rear upper side to easily view the meter 36.

Since the meter 36 is secured to the vehicle body, the meter 36 does not turn right nor left even when the handle 23 is steered right or left.

As in the sectional view of FIG. 3, a headlight 33 is provided at a lower portion of a front surface portion of the front cover 27 in a side view of the vehicle. The headlight 33 is located on a front lower side of the meter 36. An upper portion 27a of the front surface portion of the front cover 27 is provided to be inclined rear-upward in a side view of the vehicle, and the wind screen 32 is attached to the upper portion 27a.

A cover opening portion 27b penetrating through the upper portion 27a is provided at the upper portion 27a of the front cover 27. The cover opening portion 27b has substantially a rectangular shape and is covered from the front side with the wind screen 32.

The front cover 27 includes a visor 39 covering the meter 36 from the front upper side. The visor 39 is an eaves-shaped wall portion extending to be inclined rear-upward in front of the meter 36. The visor 39 is the upper portion 27a of the front surface portion of the front cover 27 extending upward beyond the meter 36.

The vehicle body frame 10 includes a stay 14a extending forward from the head pipe 14 (FIG. 3). The headlight 33 and the front cover 27 are supported by the stay 14a.

The wind screen 32 is a plate member that covers the visor 39, the airbag device 50, and the meter 36 from the front side. An upper end 32b of the wind screen 32 is located above the visor 39.

The wind screen 32 is formed of a light-transmitting material such that the passenger can view the front side through the wind screen 32. The visor 39 is provided to block light reaching the upper surface of the meter 36 from the front upper side. The visor 39 is non-transparent and has lower light transmittance than the wind screen 32.

The wind screen 32 is provided so as to be able to swing in the front-back direction of the vehicle.

Figure 4:
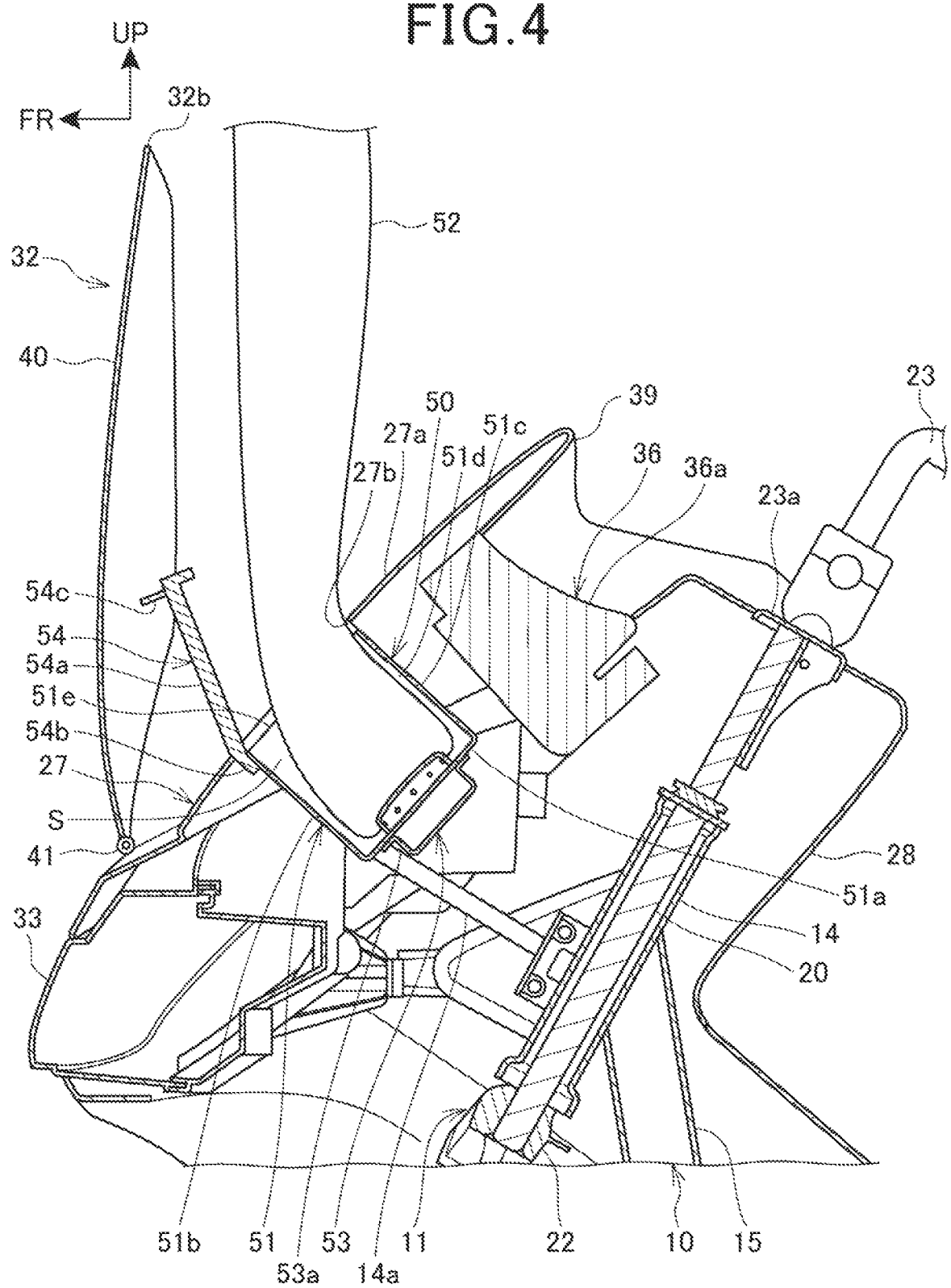
FIG. 4 is a sectional view illustrating a state in which a wind screen has swung forward.

FIG. 4 is a sectional view illustrating a state in which the wind screen 32 has swung forward.

Referring to FIGS. 2 to 4, the wind screen 32 includes a plate-shaped windshield portion 40 extending to be inclined rear-upward in a side view of the vehicle and a hinge portion 41 provided at a lower end portion of the windshield portion 40.

The windshield portion 40 is a plate member curved such that the center thereof in the vehicle width direction serves as a front end portion over the entire member in the up-down direction and is formed in a curved shaped protruding forward.

The windshield portion 40 is provided such that both side edge portions 40a, 40a (FIG. 2) in the vehicle width direction (left-right direction) abut on or are in proximity to the front surface portion of the front cover 27.

Since the windshield portion 40 is curved on the front side, a space is formed between the rear surface of the windshield portion 40 and the upper portion 27a of the front surface portion of the front cover 27 inside both left and right side edge portions 40a, 40a of the windshield portion 40.

The wind screen 32 is supported by the vehicle body via the hinge portion 41 so as to be able to swing. A turning axis line of the hinge portion 41 extends horizontally to the vehicle width direction. The wind screen 32 is able to swing in the front-back direction of the vehicle around the hinge portion 41.

Here, the hinge portion 41 is a hinge shaft extending in the vehicle width direction and is supported by the vehicle body via a support portion extending from a vehicle body frame 10 or a support portion or the like provided at the front cover 27, for example.

The airbag device 50 is disposed on the front upper side of the head pipe 14 and below the meter 36 in a side view of the vehicle.

The airbag device 50 includes a box-shaped retainer 51, an airbag 52 accommodated in the retainer 51, an inflator 53 adapted to discharge gas into the airbag 52, and a cap member 54 attached to the retainer 51.

The retainer 51 is disposed below the wind screen 32 and the meter 36 and is disposed between the meter 36 and the headlight 33 in a side view of the vehicle. The retainer 51 is disposed at the center of the vehicle width on the front upper side of the head pipe 14. The retainer 51 overlaps, from the front side, an upper portion of the head pipe 14 in a front view of the vehicle. The retainer 51 is disposed between the head pipe 14 and the upper portion 27a of the front surface portion of the front cover 27 in the front-back direction of the vehicle. The retainer 51 is supported by a stay 14a.

The retainer 51 has a box shape in which the entire front surface is opened toward the front upper side.

Specifically, the retainer 51 includes a substantially rectangular rear wall 51a, a bottom wall 51b extending forward from a lower edge of the rear wall 51a, an upper wall 51c extending forward from an upper edge of the rear wall 51a, side walls 51d, 51d extending forward from left and right side edges of the rear wall 51a, and an opening 51e in the front surface.

The rear wall 51a and the opening 51e are substantially parallel to each other in a side view of the vehicle. The retainer 51 is disposed with an inclination such that the opening 51e is in a posture inclined rear-upward along the windshield portion 40 of the wind screen 32 in a side view of the vehicle.

The upper wall 51c and the bottom wall 51b are substantially parallel to each other and are inclined rear-downward in a side view of the vehicle.

The left and right side walls 51d, 51d face each other and extend straight in the front-back direction of the vehicle.

An inner space of the retainer 51 is an airbag accommodation space S in which the airbag 52 is accommodated.

The inflator 53 is provided on the rear wall 51a of the retainer 51 and is disposed at the center of the rear wall 51a in the vehicle width direction.

The inflator 53 includes a cylindrical housing 53a. A gas forming agent and an initiator that causes the gas forming agent to start a reaction of generating gas are provided inside the housing 53a. The initiator includes an ignition device.

The inflator 53 overlaps the upper portion of the head pipe 14 in a front view of the vehicle and also overlaps the meter 36 from the front side in a plan view. It is thus possible to compactly dispose the inflator 53 using a space below the meter 36 in front of the head pipe 14.

As illustrated in FIG. 3, the airbag 52 is accommodated in an airbag accommodation space S of the retainer 51 and is disposed below the meter 36. Specifically, the airbag 52 overlaps, from the lower side, the meter 36 and the wind screen 32 in a plan view from the upper side. It is thus possible to compactly dispose the airbag 52 using a space below the meter 36 and the wind screen 32. The airbag 52 is accommodated in the retainer 51 in a folded state. A lower end portion of the airbag 52 is connected to the inflator 53.

The motorcycle 1 includes an acceleration sensor (not illustrated) adapted to detect impact acting on the motorcycle 1. The acceleration sensor is electrically connected to a control unit (not illustrated) of the motorcycle 1, and the control unit is electrically connected to the inflator 53. The control unit determines whether or not to operate the airbag device 50 on the basis of detected acceleration. In a case in which the airbag device 50 is to be operated, the control unit operates the inflator 53 to discharge gas into the airbag 52. The airbag 52 is expanded by a gas pressure and is deployed upward.

The opening 51e of the retainer 51 is exposed on the front side from the cover opening portion 27b at the upper portion 27a of the front surface portion of the front cover 27. The cover opening portion 27b has such a size that the entire opening 51e is exposed. The cap member 54 is provided in the cover opening portion 27b.

The opening 51e exposed front-upward from the cover opening portion 27b is covered and blocked with the wind screen 32 from the front side.

The cap member 54 includes a cap upper surface portion 54a adapted to cover the opening 51e from the front upper surface and a cap peripheral wall portion 54b fitted to a peripheral edge portion of the opening 51e in an integrated manner. Also, the cap member 54 includes an extending portion 54c extending from the cap upper surface portion 54a toward a rear surface of the wind screen 32 on the front upper side.

The cap member 54 is attached to the retainer 51 by the inner peripheral surface of the cap peripheral wall portion 54b being fitted to the outer peripheral surface of the peripheral edge portion of the opening 51e.

Specifically, in an ordinary state (closed state) in which the wind screen 32 is set to be inclined rear-upward as illustrated in FIG. 3, the opening 51e is blocked with the cap member 54 and is covered and closed with the wind screen 32 from the front upper side. Also, in a state before the airbag 52 is deployed as in FIG. 3, the extending portion 54c of the cap member 54 abuts on the rear surface of the wind screen 32. Note that the extending portion 54c may be in proximity to the rear surface of the wind screen 32 instead of abutting on the rear surface of the wind screen 32.

In an opened state in which the wind screen 32 has swung forward around the hinge portion 41 as illustrated in FIG. 4, the wind screen 32 is separated from the opening 51e on the front side.

Referring to FIG. 4, once gas is discharged from the inflator 53, the cap member 54 is cleaved on the front upper side by the airbag 52 deployed upward, and the airbag 52 expands forward and upward through the opening 51e of the retainer 51 and the cover opening portion 27b. The cap member 54 pushes the wind screen 32 forward via the extending portion 54c at the time of the cleavage and causes the wind screen 32 to swing forward around the hinge portion 41. In this manner, the opening 51e of the retainer 51 is opened.

The airbag 52 exits the opening 51e forward and upward and is deployed upward along the rear surface of the wind screen 32.

In the present embodiment, since the opening 51e of the retainer 51 is opened by causing the wind screen 32 to swing, it is possible to dispose the opening 51e of the retainer 51 behind the wind screen 32. It is thus possible to compactly dispose the retainer 51 using a space covered with the wind screen 32.

The retainer 51 is provided on the front upper side of the head pipe 14 and is located near the upper body from the head to the breast of the passenger in the up-down direction. It is thus possible to appropriately protect the passenger even when the length of the airbag 52 in the up-down direction in a deployed state is reduced and thereby to reduce the size of the airbag device 50.

As described above, according to the present embodiment to which the present invention is applied, the airbag device 50 for the motorcycle 1 includes: the inflator 53; the airbag 52 adapted to be expanded by gas discharged from the inflator 53; and the retainer 51 accommodating the airbag 52, the airbag 52 is deployed upward from the opening 51e of the retainer 51, the retainer 51 is disposed in front of the head pipe 14 adapted to support the handle 23 for steering, the wind screen 32 is disposed above the retainer 51, and the wind screen 32 openably and closably covers the opening 51e of the retainer 51.

With this configuration, the wind screen 32 openably and closably covers the opening 51e of the retainer 51, and the airbag 52 can be deployed upward from the opening 51e in a state in which the opening 51e is opened. It is thus possible to compactly dispose the airbag device 50 at the front portion of the motorcycle 1 using the space covered with the wind screen 32.

Also, the headlight 33 disposed in front of the head pipe 14 and the meter 36 disposed in front of the handle 23 are provided, and the retainer 51 is disposed between the headlight 33 and the meter 36 in a side view of the vehicle. With this configuration, it is possible to compactly dispose the airbag device 50 using a portion between the headlight 33 and the meter 36.

Also, the retainer 51 overlaps the head pipe 14 in a front view of the vehicle. With this configuration, it is possible to compactly dispose the retainer 51 in front of the head pipe 14 and at a position at which the retainer 51 overlaps the head pipe 14 in a front view of the vehicle.

Further, the opening 51e is opened toward the front upper side and is disposed to be inclined rear-upward in a side view of the vehicle, and the wind screen 32 is disposed to be inclined rear-upward in a side view of the vehicle. With this configuration, it is possible to deploy the airbag 52 upward from the opening and to satisfactorily block the opening 51e inclined rear-upward in a side view of the vehicle with the wind screen 32 disposed to be inclined rear-upward in a side view of the vehicle.

Also, the wind screen 32 can swing in the front-back direction via the hinge 41c provided at the lower portion of the wind screen 32. With this configuration, it is possible to efficiently open the opening 51e of the retainer 51 upward and to satisfactorily deploy the airbag 52 upward by the wind screen 32 swinging via the hinge 41c at the lower portion of the wind screen 32.

Also, the cap member 54 adapted to cover the opening 51e of the retainer 51 is provided, and the cap member 54 includes the extending portion 54c extending toward the wind screen 32. With this configuration, it is possible to cause the wind screen 32 to quickly swing by the extending portion 54c of the cap member 54 pushing the wind screen 32 and to quickly deploy the airbag 52.

Note that the aforementioned embodiment illustrates an aspect to which the present invention is applied, and the present invention is not limited to the aforementioned embodiment.

Although the aforementioned embodiment has been described on the assumption that the opening 51e of the retainer 51 is exposed on the front side from the cover opening portion 27b of the upper portion 27a of the front surface portion of the front cover 27 and is covered with the wind screen 32, the present invention is not limited thereto. For example, a configuration in which the upper portion 27a and the cover opening portion 27b are not included may be employed, and the wind screen 32 may directly cover the opening 51e of the retainer 51.

Also, although the wind screen 32 provided in front of the visor 39 has been described as an example of the wind screen in the aforementioned embodiment, the present invention is not limited thereto. The wind screen may be any wall-shaped member provided to stand in front of the retainer 51, and in a case in which the wind screen 32 is not included, for example, the upper portion 27a of the front cover 27 including the visor 39 (meter visor) may be supported by the vehicle body with a hinge, and the opening 51e may be covered with the upper portion 27a adapted to swing in the front-back direction around the hinge such that the opening 51e can be opened and closed. In this case, the upper portion 27a including the visor 39 serves as a wind screen, and the upper portion 27a also functions as a windshield. Also, the wind screen may not have light transmittance.

Also, although the motorcycle 1 has been described above as an example of a saddle-type vehicle in the aforementioned embodiment, the present invention is not limited thereto, and the present invention can be applied to a three-wheel saddle-type vehicle provided with two front wheels or rear wheels or a saddle-type vehicle provided with four or more wheels.

REFERENCE SIGNS LIST

1 Motorcycle (saddle-type vehicle)
14 Head pipe
23 Handle
32 Wind screen
33 Headlight
36 Meter
41 Hinge portion
50 Airbag device
51 Retainer
51e Opening
52 Airbag
53 Inflator
54 Cap member
54c Extending portion

The invention claimed is:

1. An airbag device for a saddle-type vehicle comprising:
an inflator;
an airbag adapted to be expanded by gas discharged from the inflator; and
a retainer accommodating the airbag, the airbag being deployed upward from an opening of the retainer,
wherein the retainer is disposed in front of a head pipe adapted to support a handle for steering, a wind screen is disposed above the retainer, and
the wind screen openably and closably covers the opening of the retainer.

2. The airbag device for a saddle-type vehicle according to claim 1,
wherein a headlight disposed in front of the head pipe and a meter disposed in front of the handle are provided, and
the retainer is disposed between the headlight and the meter in a side view of the vehicle.

3. The airbag device for a saddle-type vehicle according to claim 1,
wherein the retainer overlaps the head pipe in a front view of the vehicle.

4. The airbag device for a saddle-type vehicle according to claim 1,
wherein the opening is opened toward a front upper side and is disposed to be inclined rear-upward in a side view of the vehicle, and
the wind screen is disposed to be inclined rear-upward in a side view of the vehicle.

5. The airbag device for a saddle-type vehicle according to claim 1,
wherein the wind screen is able to swing in a front-back direction via a hinge portion provided at a lower portion of the wind screen.

6. The airbag device for a saddle-type vehicle according to claim 1,
wherein a cap member adapted to cover the opening of the retainer is provided, and
the cap member includes an extending portion extending toward the wind screen.

7. The airbag device for a saddle-type vehicle according to claim 2,
wherein the retainer overlaps the head pipe in a front view of the vehicle.

8. The airbag device for a saddle-type vehicle according to claim 2,
wherein the opening is opened toward a front upper side and is disposed to be inclined rear-upward in a side view of the vehicle, and
the wind screen is disposed to be inclined rear-upward in a side view of the vehicle.

9. The airbag device for a saddle-type vehicle according to claim 3,
wherein the opening is opened toward a front upper side and is disposed to be inclined rear-upward in a side view of the vehicle, and
the wind screen is disposed to be inclined rear-upward in a side view of the vehicle.

10. The airbag device for a saddle-type vehicle according to claim 2,
wherein the wind screen is able to swing in a front-back direction via a hinge portion provided at a lower portion of the wind screen.

11. The airbag device for a saddle-type vehicle according to claim 3,
wherein the wind screen is able to swing in a front-back direction via a hinge portion provided at a lower portion of the wind screen.

12. The airbag device for a saddle-type vehicle according to claim 4,
wherein the wind screen is able to swing in a front-back direction via a hinge portion provided at a lower portion of the wind screen.

13. The airbag device for a saddle-type vehicle according to claim 2,
wherein a cap member adapted to cover the opening of the retainer is provided, and
the cap member includes an extending portion extending toward the wind screen.

14. The airbag device for a saddle-type vehicle according to claim 3,
wherein a cap member adapted to cover the opening of the retainer is provided, and
the cap member includes an extending portion extending toward the wind screen.

15. The airbag device for a saddle-type vehicle according to claim 4,
wherein a cap member adapted to cover the opening of the retainer is provided, and
the cap member includes an extending portion extending toward the wind screen.

16. The airbag device for a saddle-type vehicle according to claim 5,
wherein a cap member adapted to cover the opening of the retainer is provided, and
the cap member includes an extending portion extending toward the wind screen.

* * * * *